United States Patent [19]

Osaka et al.

[11] Patent Number: 5,418,872
[45] Date of Patent: May 23, 1995

[54] OPTICAL CONNECTOR CONNECTING APPARATUS AND OPTICAL CONNECTOR CONNECTING METHOD

[75] Inventors: Keiji Osaka; Takeo Komiya; Yasuo Asano, all of Kanagawa; Hidetoshi Takasugi; Kazuhiko Arimoto, both of Tokyo, all of Japan

[73] Assignees: Sumitomo Electric Industries, Ltd., Osaka; Nippon Telegraph & Telephone Corporation; Sumiden Opcom, Ltd., both of Tokyo, all of Japan

[21] Appl. No.: 222,007

[22] Filed: Apr. 4, 1994

Related U.S. Application Data

[63] Continuation of Ser. No. 977,961, Nov. 18, 1992, abandoned.

[30] Foreign Application Priority Data

Nov. 18, 1991 [JP] Japan .................. 3-301710
Feb. 18, 1992 [JP] Japan .................. 4-30514

[51] Int. Cl.$^6$ .............................. G02B 6/36
[52] U.S. Cl. ........................ 385/53; 385/16
[58] Field of Search ............ 385/16, 20, 21, 22, 385/23, 53, 55, 56

[56] References Cited

U.S. PATENT DOCUMENTS

| | | | |
|---|---|---|---|
| 4,223,978 | 9/1980 | Kummer et al. | 385/22 |
| 4,239,332 | 12/1980 | Inbar | 385/22 |
| 4,303,302 | 12/1981 | Ramsey et al. | 385/22 |
| 4,610,504 | 9/1986 | Thurenius et al. | 385/23 |
| 4,645,294 | 2/1987 | Oguey et al. | 388/25 |
| 4,657,339 | 4/1987 | Fick | 385/22 |
| 4,896,935 | 1/1990 | Lee | 385/22 |

FOREIGN PATENT DOCUMENTS

| | | |
|---|---|---|
| 0274446 | 7/1988 | European Pat. Off. . |
| 02863337 | 10/1988 | European Pat. Off. . |
| 0323920 | 4/1990 | European Pat. Off. . |
| 2521735 | 8/1983 | France . |
| 8910422 | 11/1989 | Germany . |
| 63-053503 | 7/1988 | Japan . |
| 8911668 | 11/1989 | WIPO . |

OTHER PUBLICATIONS

Tateda et al, "Low–Loss Large–Scale 1×N Optical Switch", The Transactions of the IEICE, vol. 70, No. 10 Oct. 1987.
Satake et al, "Single–Mode 1×50 Switch for 10–Fiber Ribbon", The Transactions of the IEICE, vol. E70, No. 7, Jul. 1987.

*Primary Examiner*—Rodney B. Bovernick
*Assistant Examiner*—John Ngo
*Attorney, Agent, or Firm*—Cushman, Darby & Cushman

[57] ABSTRACT

Disclosed is an optical connector connecting apparatus. In the apparatus, a plurality of fixed optical connectors are mounted on a fixed member in a lined-up manner. An optical connector containing member having a movable optical connector mounted thereon is supported on a support member through a small-diameter beam. A moving plate mounted on a base supports the support member, and the movable optical connector is moved in X-axis, Y-axis and Z-axis directions so as to be connected to the fixed optical connector. Therefore, a position deviation at the time of the connection is corrected by the flexing of the small-diameter beam so that fine-positioning is unnecessary.

5 Claims, 11 Drawing Sheets

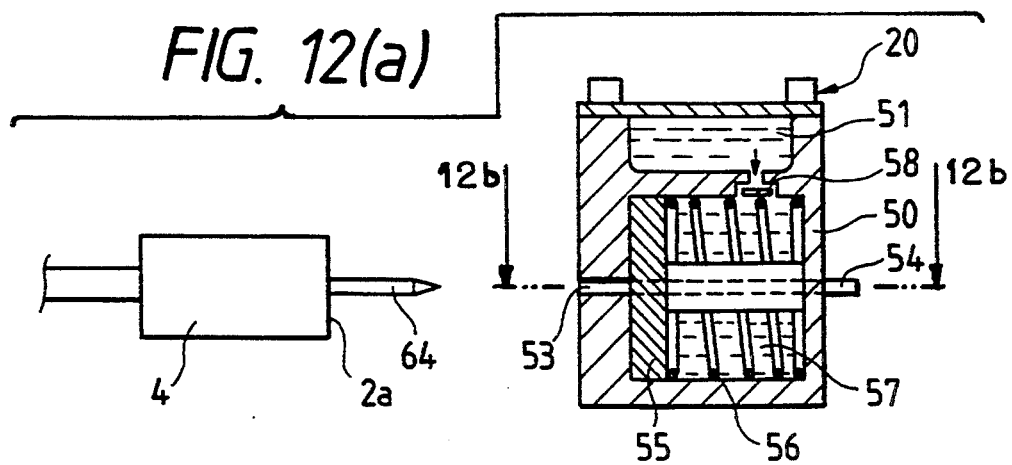
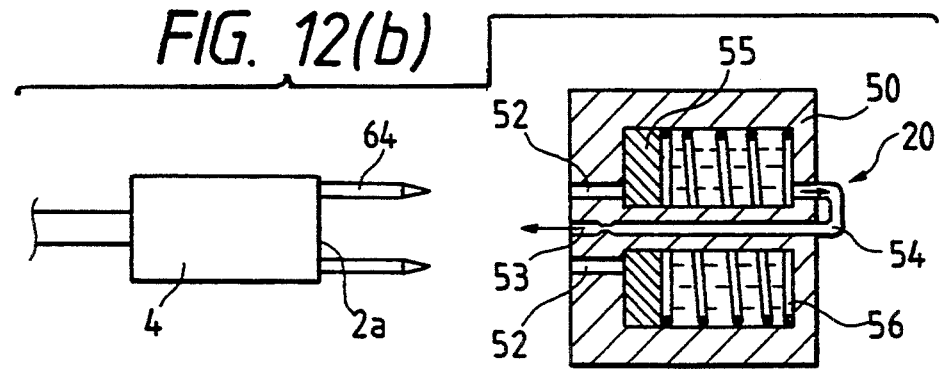
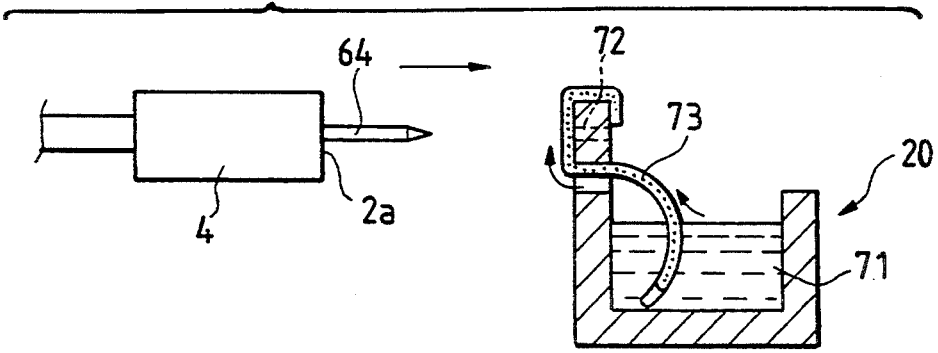

OPTICAL CONNECTOR CONNECTING APPARATUS AND OPTICAL CONNECTOR CONNECTING METHOD

This is a continuation of application Ser. No. 07/977,961, filed on Nov. 18, 1992, which was abandoned upon the filing hereof.

BACKGROUND OF THE INVENTION

The present invention relates to an optical connector connecting apparatus which is excellent in reproducibility of a connection loss to be measured, and is used for the connection of a multi-core optical connector having guide pins. Also, the invention relates to an optical connector connecting apparatus and an optical connector connecting method in which an optical path switching, excellent in reproducibility, is effected.

Conventionally, for measuring a connection loss of an optical connector, a pair of optical connectors 61 and 62 are guided through guide pins 64 as shown in FIG. 14, and are connected together, and then as shown in FIG. 15, these connectors 61 and 62 thus connected are fixed together by a resilient clip 63. With this connection method, however, the fixing by the clip 63 must be done manually, so that much labor and time have been required, and another drawback is that the reproducibility of the measured value has been poor.

Therefore, in order to overcome these drawbacks, there have been proposed connection apparatuses, using a general-purpose robot or an X-Y-Z stage movable in three axes directions.

The above-mentioned connecting apparatuses using the robot or the X-Y-Z stage are of such a construction that optical connectors are connected by guide pins or a ferrule, and therefore the positioning of the guide pins must be done with a high precision on the order of not more than a micron. Therefore, much labor and time have been required for the positioning, and besides the positioning control mechanism has become bulky, which has disadvantageously resulted in high costs.

Further, the connecting surfaces of the optical connectors have fine depressions and projections, and it is possible that when these connectors are connected together, a gap on the order of 0.1 μm to several tens of μm will be formed between optical fiber cores of the connectors. Therefore, in order to prevent a deterioration of a connection loss and reflection characteristics which are caused by this gap, it is a common practice to fill this gap with a matching agent which matches the refractive index with the optical fiber core. The matching agent is manually applied to connecting surfaces, using an applicator 65 as shown in FIG. 16 or a toothpick. However, much labor and time have been required for such a manual application of the matching agent.

SUMMARY OF THE INVENTION

With the foregoing in view, it is an object of the invention to provide an optical connector connecting apparatus which provides a good reproducibility of connection, and does not require a complicated control mechanism.

In order to achieve this object, there must be provided the type of construction in which the connection surfaces of a pair of opposed fixed and movable optical connectors to be connected together can be positively brought into intimate contact with each other using guide pins or a ferrule. Here, assuming that the connection surfaces are disposed perpendicular to the guide pins or the ferrule, there are two kinds of deviations of the guide pin or the ferrule from its mating fitting hole, that is, the deviation due to a parallel movement and the deviation due to the rotation or the bending.

On the other hand, it is possible to support the movable optical connector by a mechanical element, such as a linear guide and a ball bearing, so that this connector can be stably connected to the fixed optical connector. However, if such a mechanism is used, the rigidity of the moving mechanism must be increased, and this would increase the force required for the driving, and as a result the apparatus would become bulky, and there is a possibility that the optical connector would be damaged unless the driving force is not suitably controlled. Therefore, it is necessary to provide an arrangement in which a displacement of several tens to several hundreds μm is enabled by a following force of about several hundreds grams.

Further, for continuously checking a plurality of optical connectors, it is difficult, because of limited time, to precisely effect a position adjustment in accordance with the position of each fixed optical connector each time each fixed optical connector is checked. Besides, the amount of displacement (commonly called "offset") between the connected movable and fixed connectors varies depending on the combination.

The present invention provides an optical connector connecting apparatus including a first optical connector fixedly supported on a body of the apparatus; a second optical connector movably supported on the apparatus body, the second optical connector being moved to be connected to the first optical connector; and an elastic member for mediating between one of the optical connectors and the apparatus body, wherein a connection loss or reflection produced by a connection of the optical connectors is measured.

BRIEF DESCRIPTION OF THE DRAWINGS

FIG. 12(a) is a vertical cross-sectional view of a matching agent coating mechanism in a sixth embodiment of the invention;

FIG. 12(b) is a view taken along the line 12b—12b of FIG. 12(a);

FIG. 13 is a vertical cross-sectional view of a matching agent coating mechanism in a seventh embodiment of the invention;

DETAILED DESCRIPTION OF THE PREFERRED EMBODIMENTS

A first embodiment of an optical connector connecting apparatus of the present invention is shown in FIGS. 1 to 4, and this embodiment will now be described with reference to these Figures.

Figure 1:
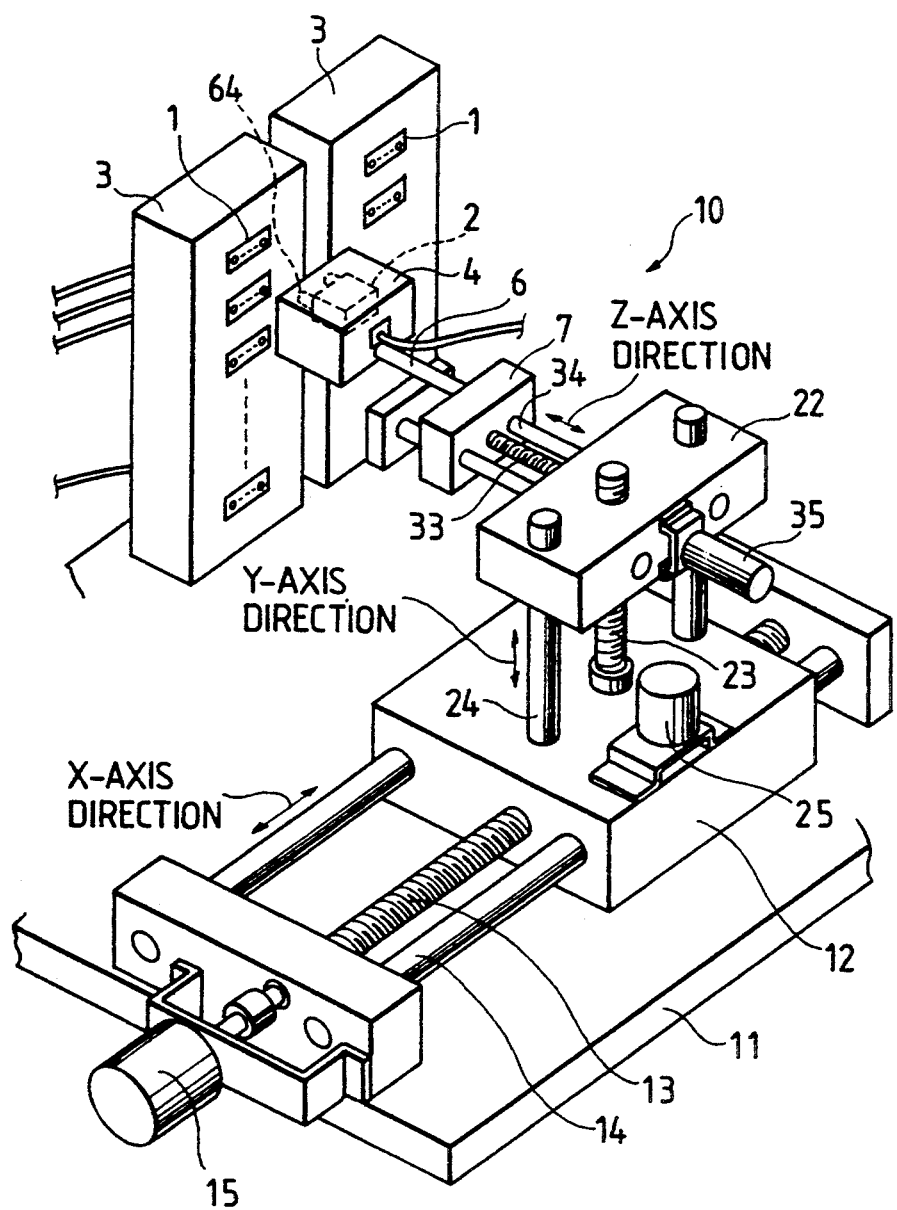
FIG. 1 is a perspective view showing a basic construction of a first embodiment of the present invention.

FIG. 1 shows a basic construction of the first embodiment. As shown in this Figure, a plurality of fixed optical connectors (first optical connectors) 1 are mounted on fixed members 3 in a lined-up manner. A movable optical connector (second optical connector) 2 is mounted on an optical connector containing member 4 in opposed relation to the fixed optical connectors 1. The optical connector containing meter 4 is fixedly secured through a small-diameter beam (elastic member) 6 (1.5 mm in diameter in this embodiment) to a support member 7 on an apparatus body 10.

On the other hand, a support bed 12 is supported on a base 11 through a ball thread 13 and guide shafts 14 so as to move in an X-axis direction, the base 11 constituting part of the apparatus body 10. An X-axis motor 15 mounted on the base 11 rotates the ball thread 13 to move the support bed 12 in the X-axis direction.

A moving plate 22 is supported on the support bed 12 through a ball thread 23 and guide shafts 24 so as to move in a Y-axis direction perpendicular to the X-axis direction. A Y-axis motor 25 mounted on the support bed 12 rotates the ball thread 23 to move the moving plate 22 in the Y-axis direction.

Further, the above-mentioned support member 7 is supported on the moving plate 22 through a ball thread 33 and guide shafts 34 so as to move in a Z-axis direction perpendicular to the X-axis direction and the Y-axis direction. A Z-axis motor 35 mounted on the moving plate 22 rotates the ball thread 33 to move the support member 7 in the Z-axis direction.

Namely, the apparatus is constituted by the support member 7, the base 11, the ball threads 13, 23 and 33, the guide shafts 14, 24 and 34, the motors 15, 25 and 35 and so on, and the apparatus body 10 serving as the X-Y-Z stage movably supports the movable optical connector 2 through the small-diameter beam 6.

Next, the measurement of an optical attenuation of the fixed optical connector 1 by the optical connector connecting apparatus of the above construction will now be described.

The motors 15, 25 and 35 on the apparatus body 10 are driven under a servo control to move the support member 7 to a prescribed address in the sequence of the X-axis, the Y-axis and the Z-axis. The movable optical connector 2 supported through the small-diameter beam 6 is positioned, and is connected to the fixed optical connector 1 to measure the amount of the optical attenuation.

Thus, the movable optical connector 2 is mounted on the support member 7 through the small-diameter beam 6, and therefore when the above connection is to be effected, the connector 2 is sufficiently displaced with a small force, following the opposed fixed optical connector 1, so that the good connection can be achieved. When the connection is to be released by returning the support member 7 toward the movable plate 22, the restraint by the fixed optical connector 1 is released, and the support member is returned to the neutral position by the elasticity of the small-diameter beam 6.

Figure 2:
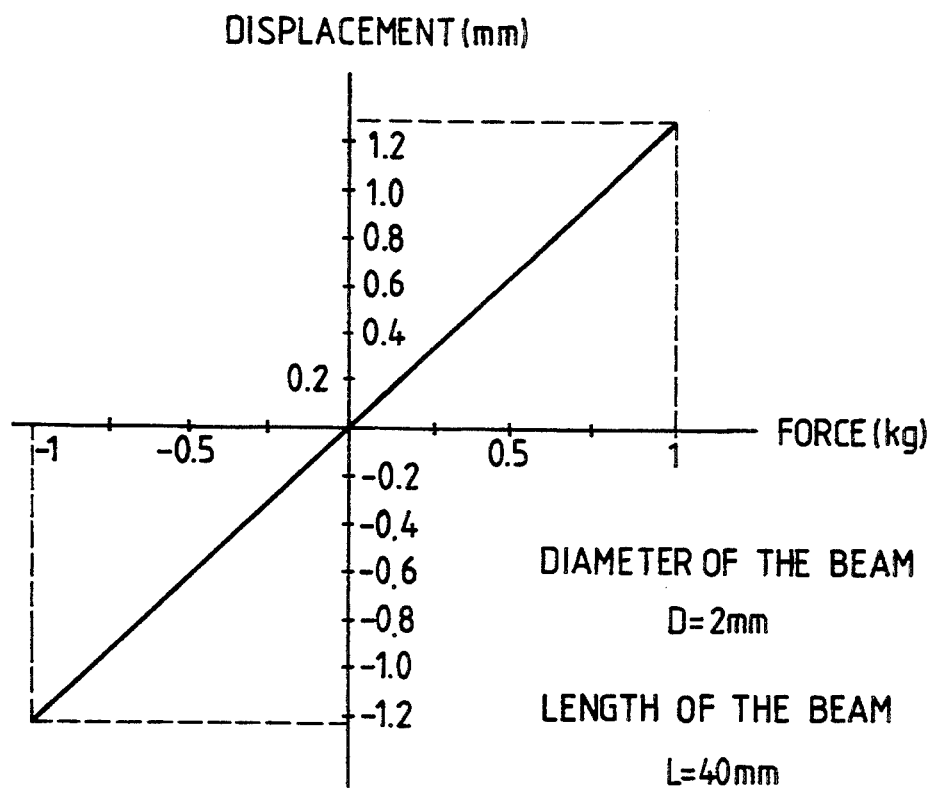
FIG. 2 is a diagram explanatory of the relation between a force and a position of a small-diameter beam in the first embodiment of the present invention.

Namely, at the distal end portion of the small-diameter beam 6, the relation between the force and the displacement is generally linear as shown in FIG. 2, and there are provided the characteristics without normal and reverse hysteresis, and a displacement of 0.4 mm or more is produced with a force of 1 kg.

Figure 3A:
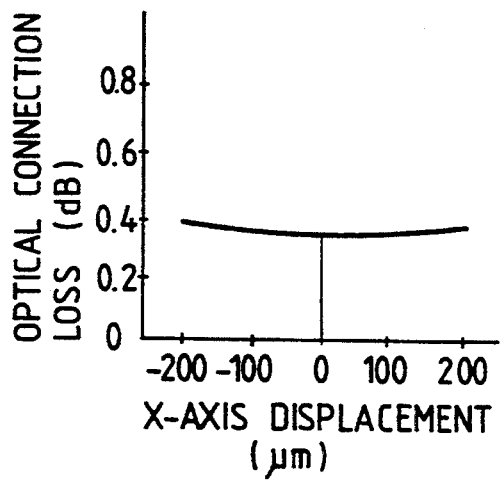
FIGS. 3(a) and 3(b) are diagrams each explanatory of a displacement of an optical connector and an optical connection loss in the first embodiment of the invention.
Figure 3B:
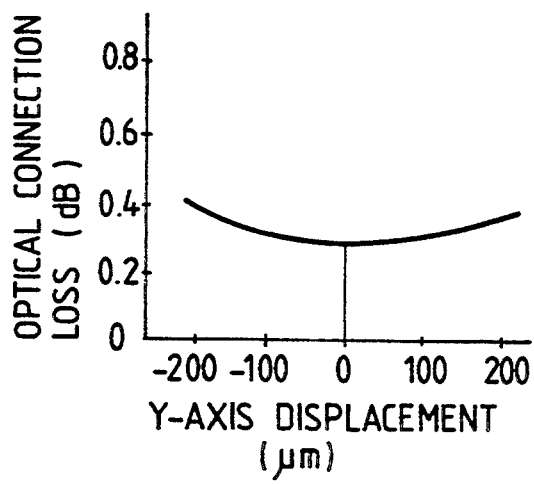
Figure 4A:
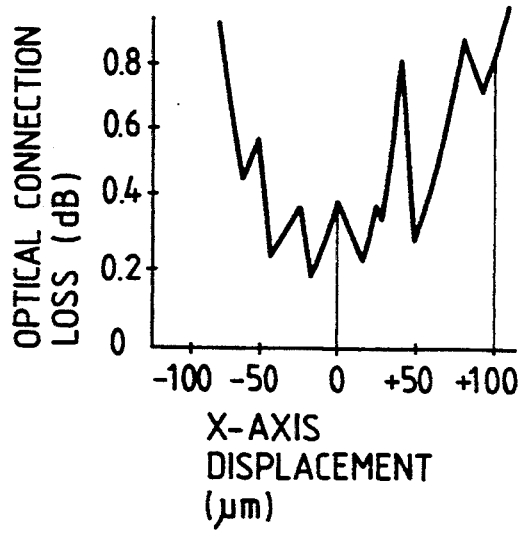
FIGS. 4(a) and 4(b) are diagrams each explanatory of a displacement of an optical connector and an optical connection loss in the prior art.
Figure 4B:
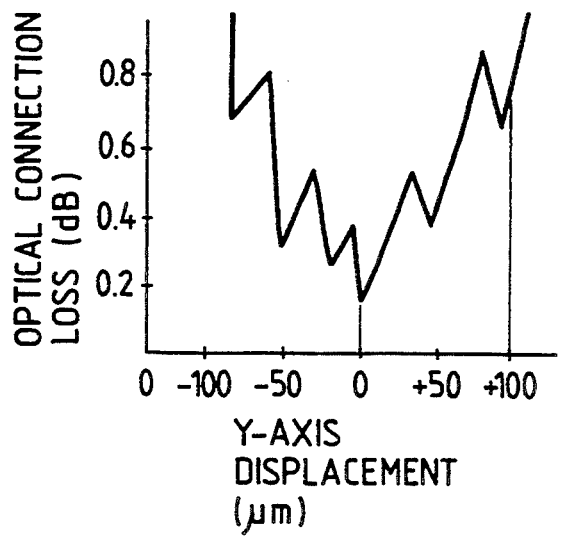

FIGS. 3(a) and 3(b) show the dependency of the connection loss on the displacement amount in this embodiment. FIG. 3(a) shows the relation between the connection loss and the displacement in the X-axis direction, and FIG. 3(b) shows the relation between the connection loss and the displacement in the Y-axis direction. On the other hand, FIGS. 4(a) and 4(b) show a similar relation in connection with a comparative example, and show the relation between the displacement and the optical connection loss in the case where a movable optical connector is mounted within a box-like container with a gap. In FIGS. 4(a) and 4(b), the connection loss greatly varies, and therefore the position dependency in the X-axis and Y-axis directions can not be read, and from the view point of the reproducibility the effect achieved by the construction of the embodiment of the present invention has become clear from these Figures.

Figure 5A:
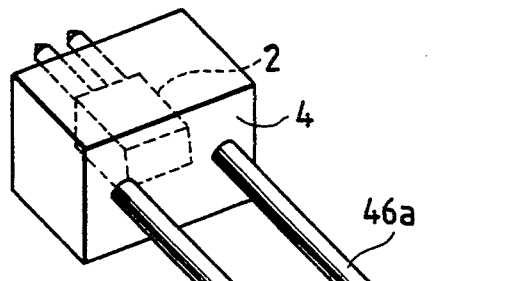
FIGS. 5(a) and 5(b) are perspective views of a second embodiment of the invention, each showing an optical connector and its surroundings.
Figure 5B:
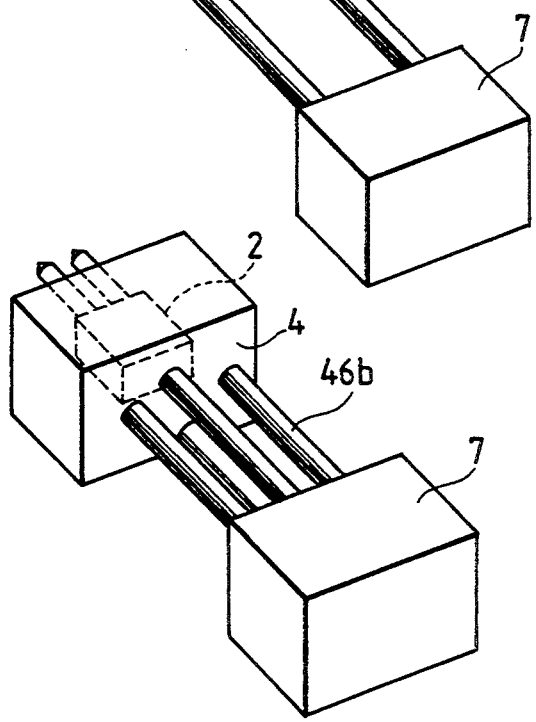

Next, a second embodiment of the present invention is shown in FIGS. 5(a) and 5(b), and this embodiment will now be described with reference to this Figure. An apparatus body used here is the same as that used in the first embodiment, and explanation thereof will be omitted.

In FIG. 5(a), two small-diameter beams 46a of a cylindrical shape are disposed parallel to each other, and are interposed between a support member 7 and an optical connector containing member 4, and a movable optical connector 2 is supported through the two small-diameter beams 46a. In FIG. 5(b), four small-diameter beams 46b are disposed parallel to one another, and are interposed similarly. Therefore, the movable optical connector 2 properly corrects a position deviation through the flexing of the small-diameter beams 46a or 46b.

Figure 6A:
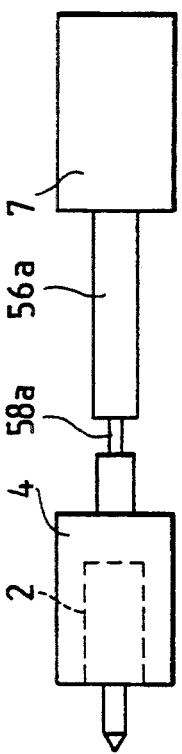
FIGS. 6(a) and 6(b) are side-elevational views of a third embodiment of the invention, each showing an optical connector and its surroundings.
Figure 6B:
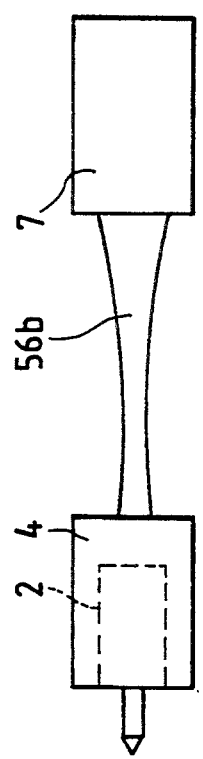

Next, FIGS. 6(a) and 6(b) show a third embodiment of the present invention, and this embodiment will now be described with reference to this Figure. Explanation of an apparatus body will be omitted as in the above embodiment.

In FIG. 6(a), although there is provided a single small-diameter beam 56a, it has a reduced-diameter portion 58a intermediate the opposite ends thereof. In FIG. 6(b), similarly, there is provided a single small-diameter beam 56b, and that portion of this beam intermediate the opposite ends thereof is progressively narrow. Therefore, a movable optical connector 2 properly corrects a position deviation through the flexing of the small-diameter beam 56a or 56b of such a shape.

Figure 7:
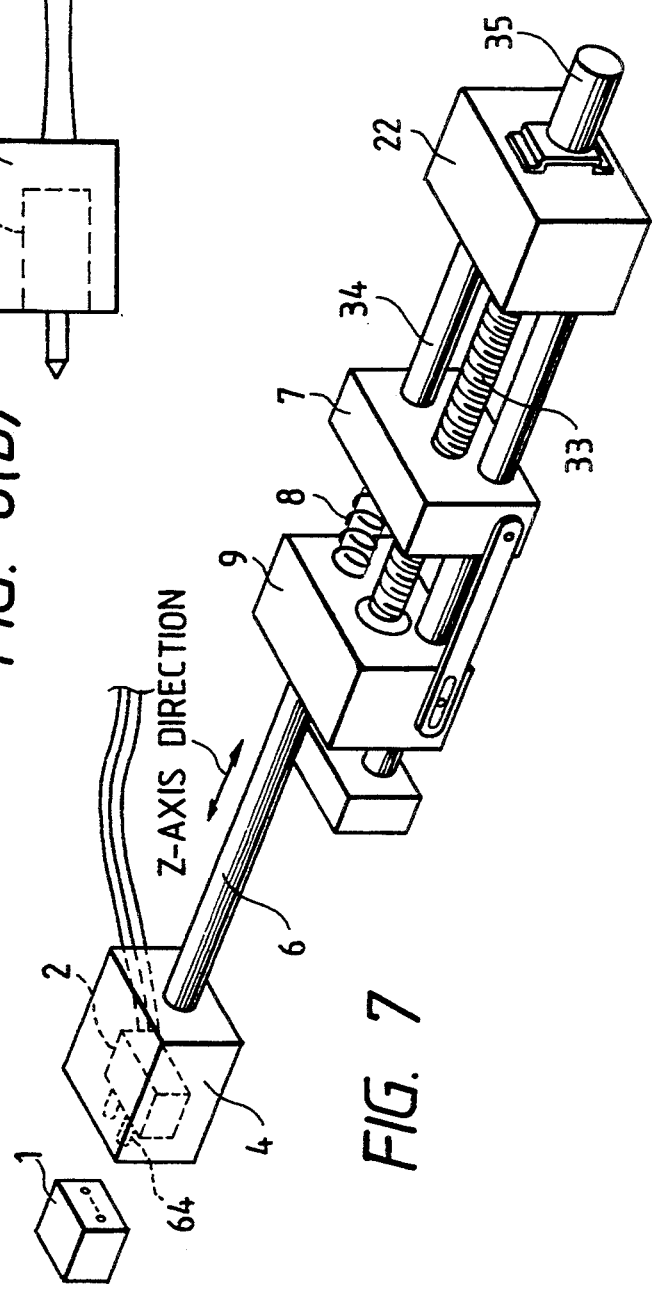
FIG. 7 is a perspective view of a fourth embodiment of the invention, showing optical connectors, a support blocks and the surroundings thereof.

Next, FIG. 7 shows a fourth embodiment of the present invention, and this embodiment will now be described with reference to this Figure. Explanation of a lower portion of an apparatus body 10 will be omitted as in the foregoing.

As shown in FIG. 7, a support member 7 is supported on a moving plate 22 through a ball thread 33 and guide shafts 34 so as to move in a Z-axis direction, and the ball thread 33 is rotated by a Z-axis motor 35 mounted on the moving plate 22. Further, a support block 9 is mounted on the support member 7 through a coil spring (spring member) 8, and an optical connector containing member 4 is mounted on the support block 9 through a small-diameter beam 6. Therefore, a spring force can be produced in the Z-axis direction which is the connection axis direction. A movable connector 2 is fixedly mounted on the optical connector containing member 4.

In the above construction, when the movable optical connector 2 is to be connected to a fixed optical connector 1 by driving the Z-axis motor 35, a predetermined urging pressure is produced by the resiliency of the coil spring 8, and the measurement of a loss amount can always be effected in a stable manner.

In the above embodiments, although the optical attenuation amount is measured using the movable optical connector as the measurement-side optical connector whereas the fixed optical connector is used as the light source-side connector, this may be reversed, that is, the movable optical connector may be the light source-side one whereas the fixed optical connector may be the measurement-side one.

In the optical connector connecting apparatuses of the present invention, the optical connector is mounted on the apparatus body through the flexible member such as the elastic member, and as a result when the optical connectors are to be connected together, such opposed optical connectors are suitably brought into agreement with each other to be connected together. Therefore, the reproducibility of the connection loss amount is excellent, and besides the need for a fine positioning mechanism which would make the apparatus complicated is obviated. Therefore, the automatic measurement apparatus can be easily produced.

Continuously, a fifth embodiment of an optical connector connecting apparatus of the present invention is shown in FIGS. 8 to 11, and this embodiment will now be described with reference to these Figures. The optical connector connecting apparatus in this embodiment is the same in construction as that in the first embodiment shown in FIG. 1, except for the provision of a matching agent coating mechanism 20. Therefore, explanation of the same portions as those in the first embodiment will be omitted.

Figure 8:
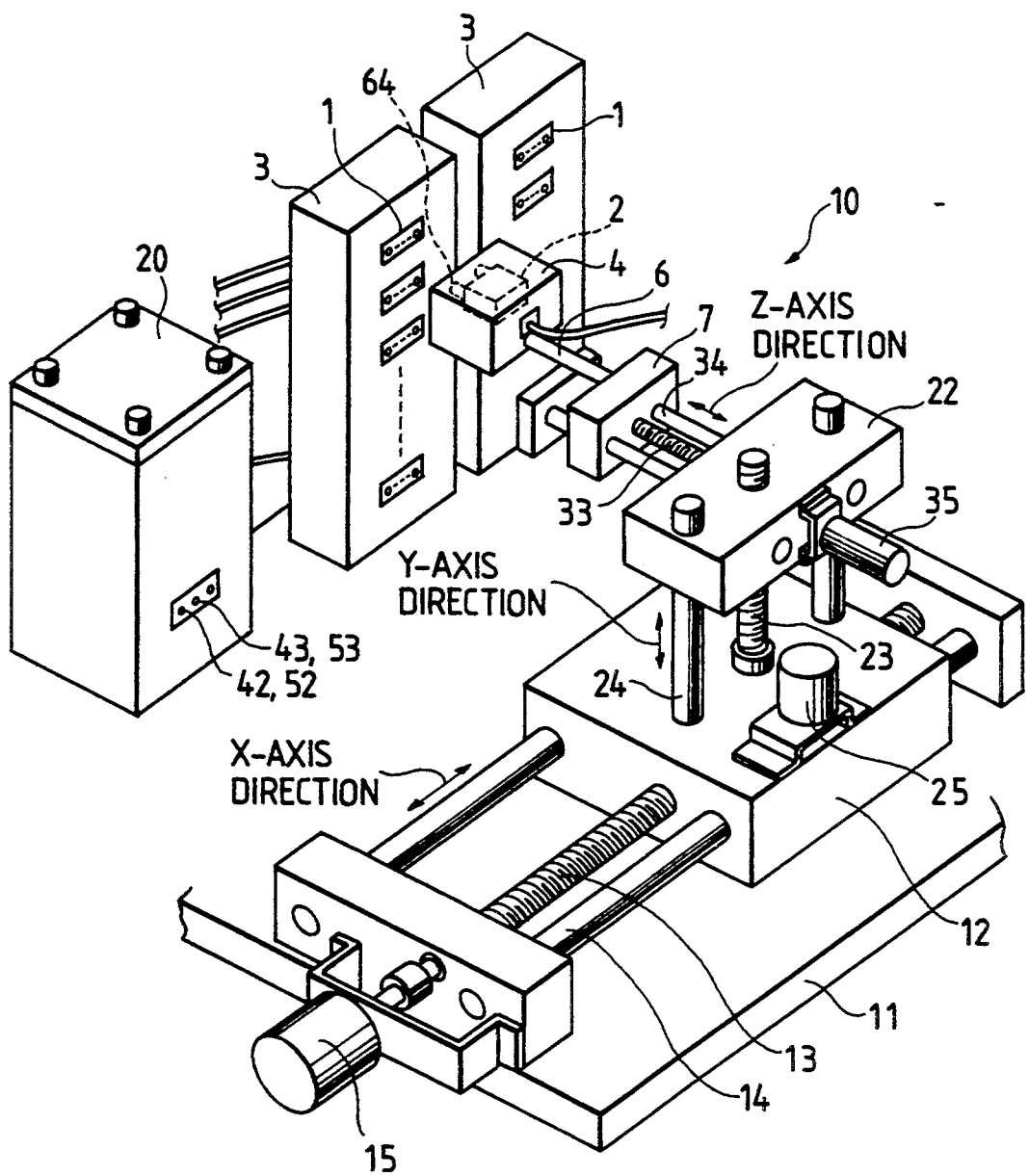
FIG. 8 is a perspective view showing a basic construction of a fifth embodiment of the present invention.

In FIG. 8, the matching agent coating mechanism 20 is mounted on a base 11 in parallel relation to fixed members 3, and therefore the matching agent coating mechanism 20 faces the connecting surface of a movable optical connector 2.

Figure 9A:
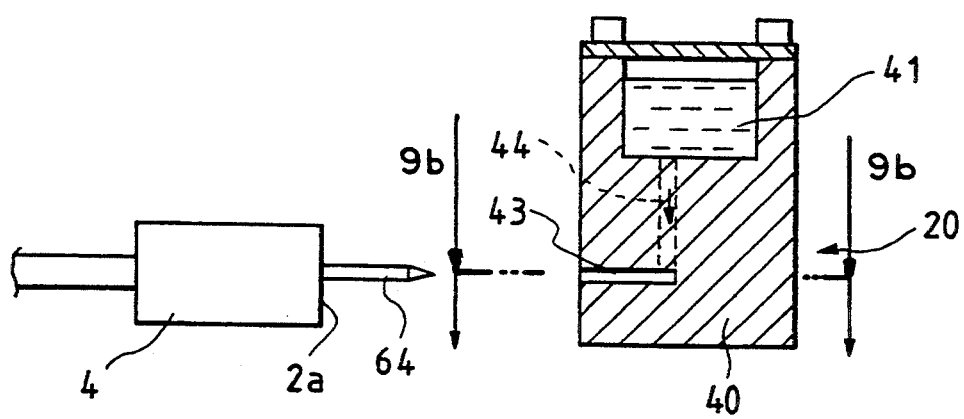
FIG. 9(a) is a vertical cross-sectional view showing a matching agent coating mechanism in the fifth embodiment.
Figure 9B:
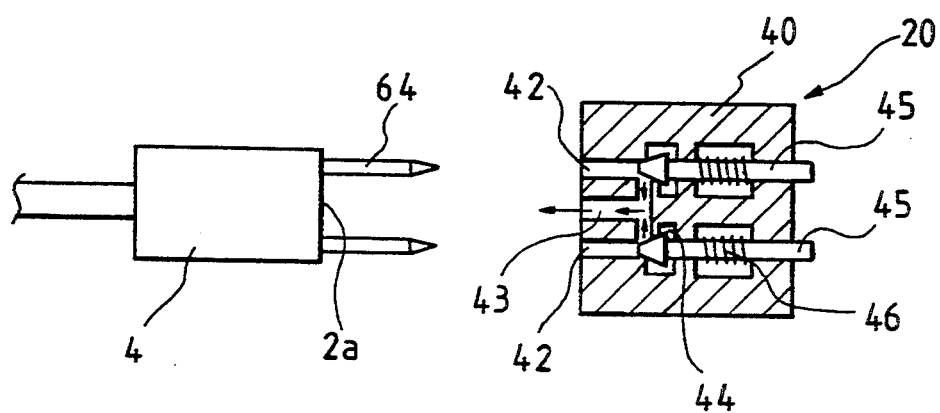
FIG. 9(b) is a view taken along the line 9b—9b of FIG. 9(a)

As shown in FIGS. 9(a) and 9(b), in the matching agent coating mechanism 20, a pair of insertion holes 42 for respectively receiving guide pins 64 are formed in a lower portion of a case 40 which has at its upper portion a tank 41 for holding the matching agent. An outlet 43 is also formed in this lower portion, and is disposed between the insertion holes 42. The outlet 43 is connected to the tank 41 by an introduction passage 44, part of the introduction passage 44 intersects the insertion holes 42. A pair of plunger-like pins 45 are provided in registry respectively with the insertion holes 42. A spring 46 wound around the pin 45 normally urges a generally conically-shaped head of the pin 45 toward the outlet 43 to close the introduction passage 44. Therefore, the pins 45 and the springs 46 constitute the opening and closing means.

The movable optical connector 2 approaches the case 40, and the guide pins 64 are inserted respectively into the insertion holes 42, so that the movable optical connector is abutted against the case 40. As a result, the pins 45 are retracted to open the introduction passage 44, and the matching agent is applied from the outlet 43 to be coated to the connecting surface 2a of the movable optical connector 2.

Next, reference is now made to the switching of the optical paths of the fixed optical connectors by the optical connector connecting apparatus of the above construction.

The apparatus body 10 is driven under a servo control of the motors 15, 25 and 35 to move the support member 7 in the sequence of the X-axis, the Y-axis and the Z-axis. The movable optical connector 2 supported through the small-diameter beam 6 is positioned, and is connected to the fixed optical connector 1, thereby switching the optical path.

At this time, the movable optical connector 2, instructed to be connected to a selected one of the fixed optical connectors 1, is first abutted against the matching agent coating mechanism 20 disposed in opposed relation to the movable optical connector 2, and the matching agent is coated to the end face of the movable optical connector 2. The movable optical connector 2 is abutted against the matching agent coating mechanism 20 either each time the instruction to connect the movable optical connector 2 to the fixed optical connector 1 is produced, or each time per they are connected a predetermined number (N) of times.

Figure 10:
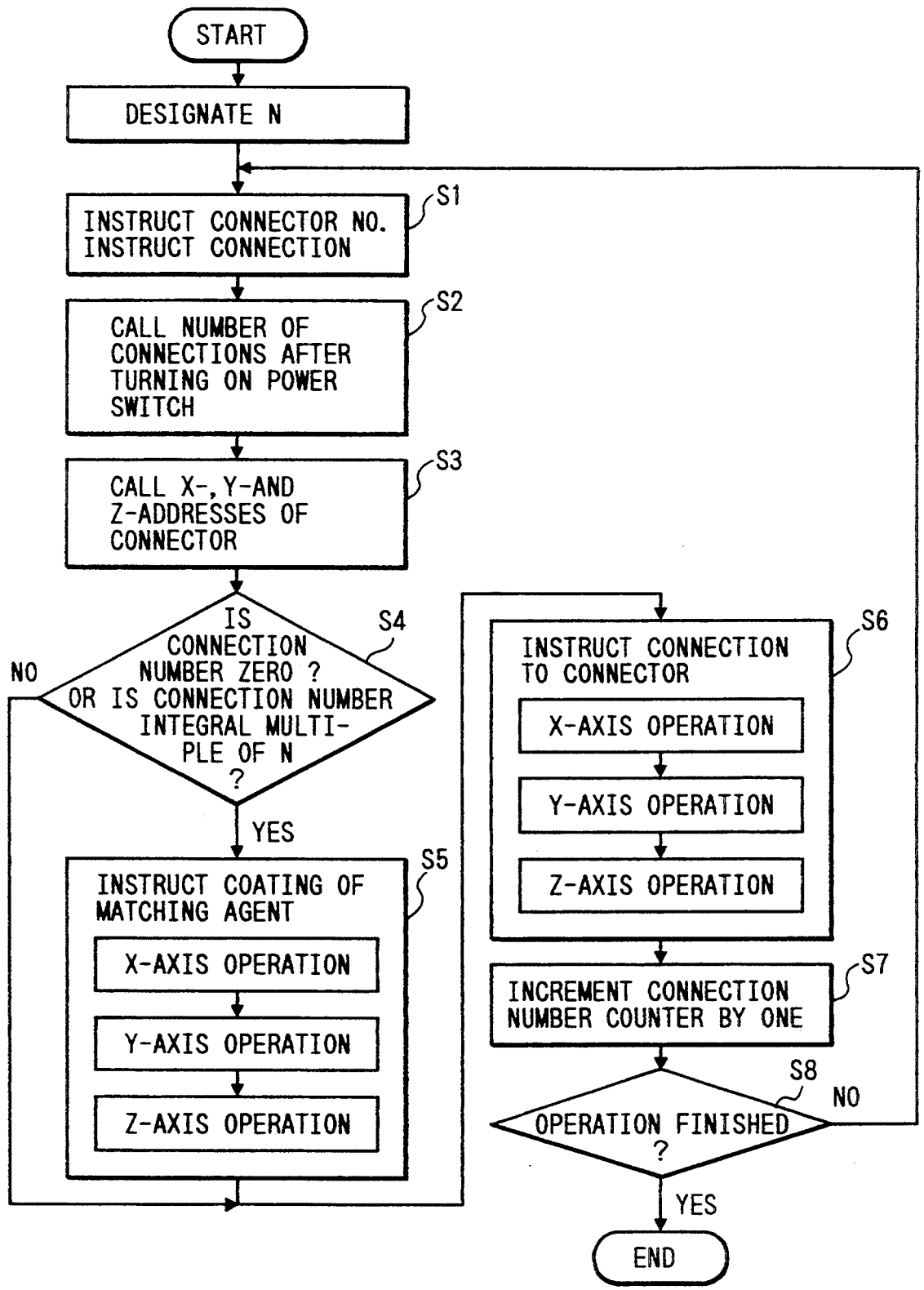
FIG. 10 is a procedure of an operation program of the connection of an optical connector in the embodiment of the invention.

FIG. 10 shows one example of operation program with respect to an optical connector connecting method of the present invention, and the operation will be described with reference to this Figure.

As shown in FIG. 10, when the operation is started, the number of the fixed optical connector 1, as well as the connection, is instructed in Step S1. In Step S2, a required number of connections is recalled from the memory whenever the power switch is turned on.

In Step S3, the X-, Y- and Z-direction addresses of the fixed optical connector 1 to be connected are called, and the target position is confirmed.

In Step S4, the present connection number is judged, and if the connection number is not 0 or an integral multiple of N, the program shifts to Step S6. If the connection number is 0 or an integral multiple of N, the program shifts to Step S5.

In Step S5, a matching agent coating instruction is produced, and the movable optical connector 2 is moved in the sequence of the X-axis, the Y-axis and the Z-axis, and the guide pins 64 are inserted into the insertion holes 42 in the matching agent coating mechanism 20, so that the matching agent is coated onto the connecting surface 2a of the movable optical connector 2. Then, the movable optical connector 2 is withdrawn, and is returned to the initial position.

In Step S6, an instruction for the connection to the fixed optical connector 1 is produced, the movable optical connector 2 is moved in the sequence of the X-axis, the Y-axis and the Z-axis relative to the fixed optical connector to be connected, and is connected thereto. Then, in this condition, signals are sent to effect various measurements. Instead of the sequential motion from X to Z in Step S5 or S6, a parallel motion of X and Y can be employed for the purpose of time-saving. In the latter case, Z motion should be independent to avoid the damage of guide pins and the connectors.

In Step S7, the count of a connection number counter is incremented one, and in Step S8, it is judged whether or not this connection number reaches the predetermined number. If this result is "NO", the program returns to Step S1, and if this result is "YES", the program is finished.

Figures 11A, 11B:
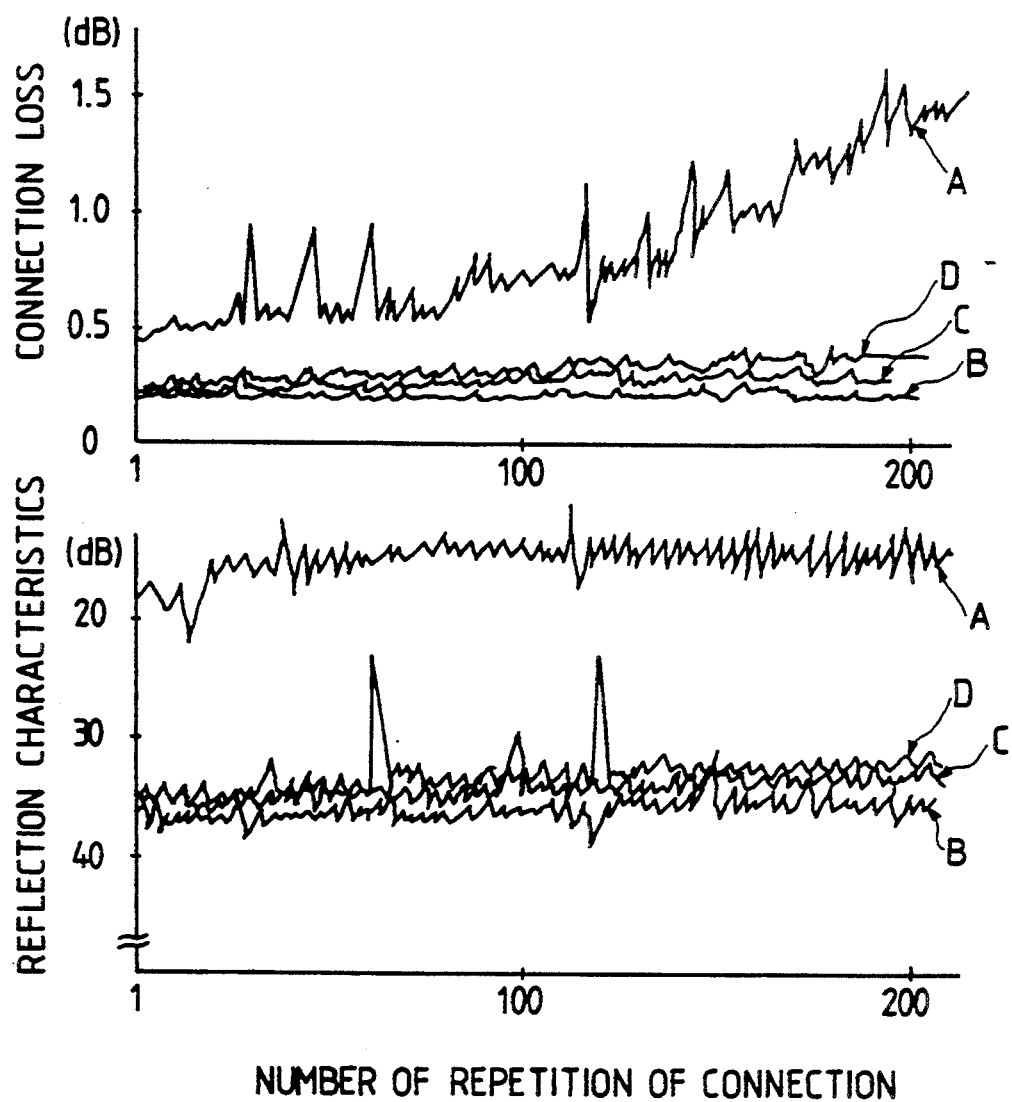
FIG. 11 is a diagram showing the difference in connection characteristics between the case where the matching agent is applied and the case where the matching agent is not applied.
Figure 14:
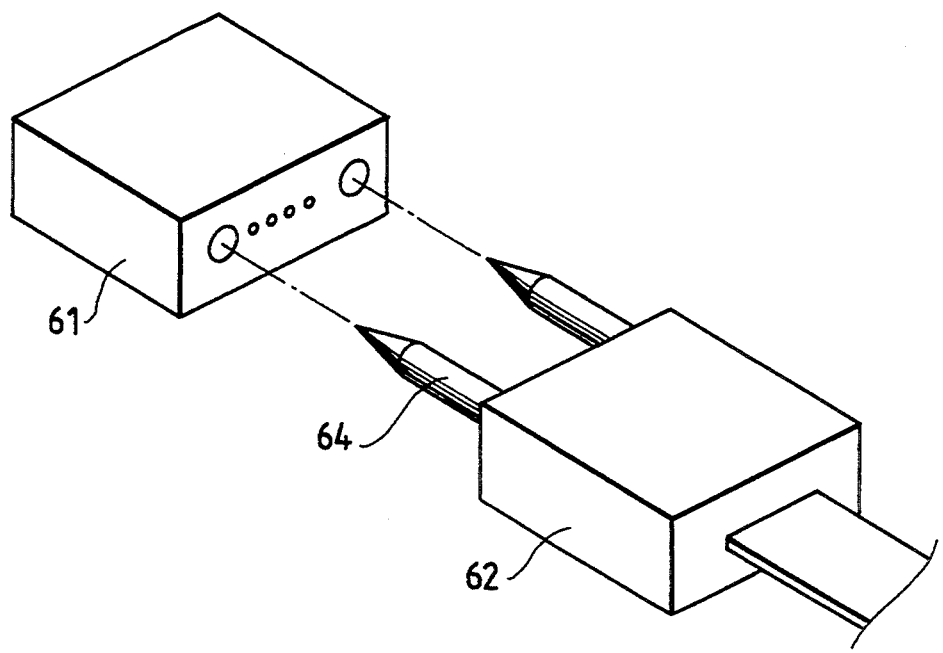
FIG. 14 is a perspective view of conventional optical connectors.
Figure 15:
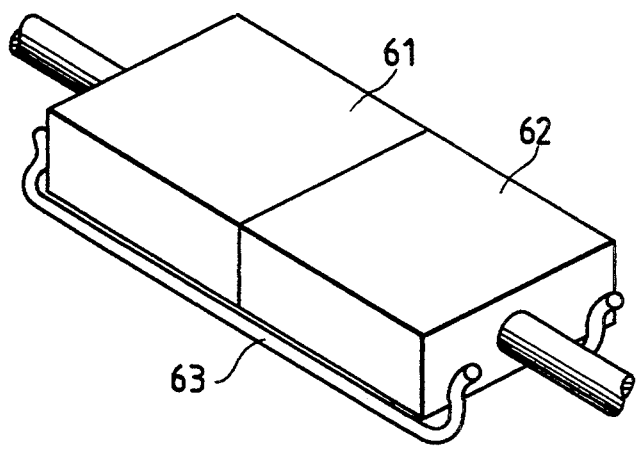
FIG. 15 is a perspective view of the conventional optical connectors in its connected condition.
Figure 16:
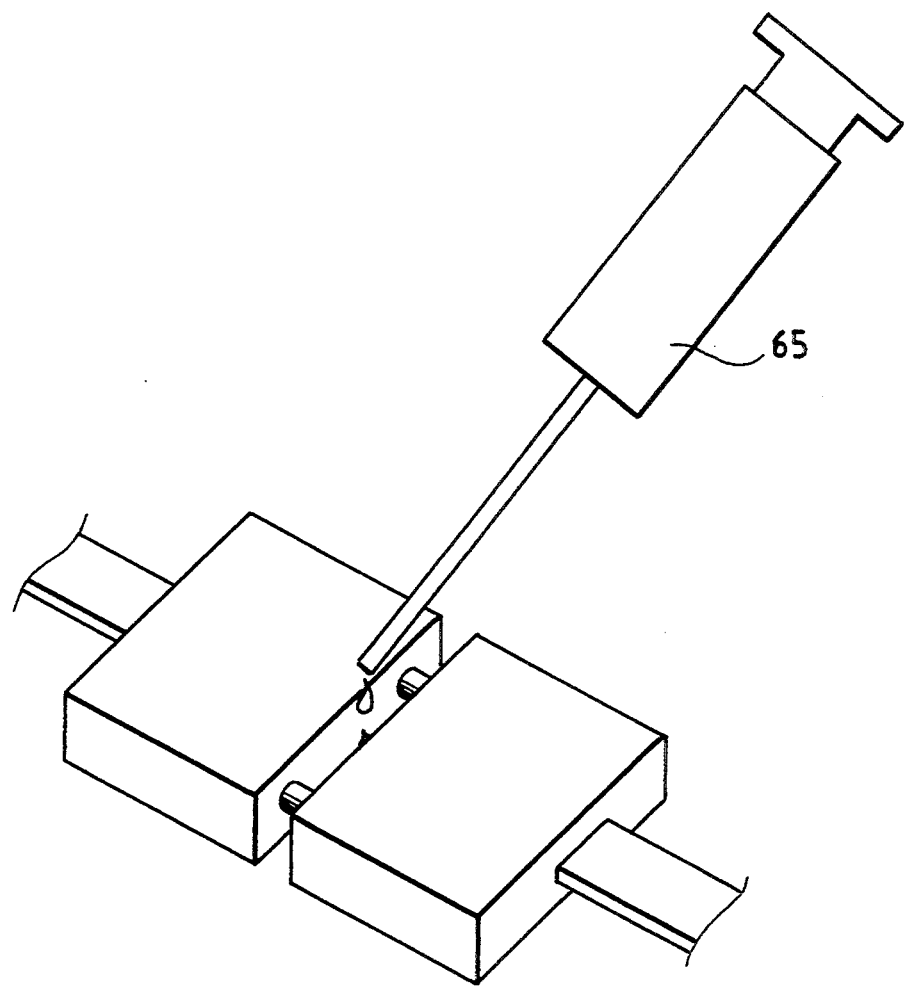
FIG. 16 is a perspective view showing the manner of coating a matching agent to the conventional optical connectors.

Next, results of tests for confirming the effect of the above optical connector connecting method and apparatus are shown in FIG. 11, and this will be explained with reference to this Figure.

Referring to the conditions here, the case where the matching agent is not applied at all is a condition A. The case where the matching agent is applied each time the connection is effected is a condition B. The case where the matching agent is applied each time the connection is effected 10 times is a condition C. The case where the matching agent is applied each time the connection is effected 50 times is a condition D. In each case, the connection loss of the optical connector, as well as reflection characteristics thereof, was measured. As a result, as shown in FIG. 11, it has been confirmed that the characteristics in the conditions B and C are excellent.

Next, a sixth embodiment of an optical connector connecting apparatus of the present invention is shown in FIGS. 8, 10, 11, 12(a) and 12(b), and this embodiment will now be described with reference to these Figures. Those portions identical to those of the fifth embodiment will be designated by identical reference numerals, respectively, and a repetition of the explanation is omitted.

As shown in FIGS. 12(a) and 12(b), a cylinder 57, having a piston 55 urged left by a spring 56, is formed in a lower portion of a case 50 of a matching agent coating mechanism 20 which has at its upper portion a tank 51 for holding a matching agent. The tank 51 is communicated via a valve 58 with the space in the cylinder 57, and the valve 58 is opened and closed by the reciprocal movement of the piston 55 in right and left directions. There is provided an introduction passage 54 extending from the space of the cylinder 57 to an opening 53 disposed midway between insertion holes 52, and the matching agent is forced from the space of the cylinder 57 into the introduction passage 54 by the reciprocal movement of the piston 55, so that the matching agent is discharged from the opening 53.

Therefore, the movable optical connector 2 approaches the case 50, and the guide pins 64 are inserted respectively into the insertion holes 52, so that the movable optical connector 2 is abutted against the case 50. As a result, the piston 55 is moved right, so that the matching agent flows out of the case 50 to deposit on the connecting surface 2a of the movable optical connector 2. When the guide pins 64 are withdrawn from the insertion holes 52, the spring 56 is urged left, and therefore the piston 55 is moved, and at the same time the valve 58 is opened to replenish the cylinder 57 with the matching agent.

Next, a seventh embodiment of an optical connector connecting apparatus of the present invention is shown in FIGS. 8, 10, 11 and 13, and this embodiment will now be described with reference to these Figures. Those portions identical to those of the fifth embodiment will be designated by identical reference numerals, respectively, and a repetition of the explanation is omitted.

As shown in FIG. 13, a swelling cloth 73 is supported on an outer peripheral surface of a tank 71 of a matching agent coating mechanism 20 which holds a matching agent. The lower end portion of the swelling cloth 73 is dipped in the matching agent. A pair of insertion holes 72 for respectively receiving the guide pins 64 are formed in the upper portion of the tank 71 in such a manner that the swelling cloth 73 is disposed between these insertion holes 72. Therefore, when the movable optical connector 2 is abutted against the swelling cloth 73 with the guide pins 64 inserted in the insertion holes 72, the matching agent impregnated in the swelling cloth 73 by a surface tension is applied to the connecting surface of the movable optical connector 2.

In the above description, although the guide pins 64 of the movable optical connector 2 push the plunger-like pins 45 or the piston 55, the part for pushing these pins 45 and piston 55 are not limited to the guide pins 64, and any part connected to the movable optical connector 2 may be used for this purpose.

In the optical connector connecting apparatus according to the present invention, the matching agent is provided between the connecting surfaces when the optical connectors are connected together, and therefore the connection loss amount is reduced, and the fine positioning mechanism which makes the apparatus construction complicated becomes unnecessary.

What is claimed is:

1. An optical connector connecting apparatus comprising:
    a first optical connector fixedly supported on a body of said apparatus;
    a second optical connector movably supported on the apparatus body,
    an elastic member having first and second ends, said first end being coupled to said second optical connector,
    means coupled to said second end of said elastic member for moving said elastic member and thus said second optical connector in three spatial planes so as to connect said second optical connector to said first optical connector;
    whereby a connection loss due to displacement of the second optical connector in at least two of the spatial planes is minimized.

2. The optical connector connecting apparatus according to claim 1, wherein said elastic member includes a beam which has flexibility and has a narrow, elongate shape, said second optical connector being mounted and supported on a distal end of said beam.

3. The optical connector connecting apparatus according to claim 2, wherein said beam varies in cross-sectional shape in its longitudinal direction.

4. The optical connector connecting apparatus according to claim 1, wherein said elastic member includes a plurality of beams which have flexibility and have a narrow, elongate shape, said second optical connector being mounted and supported on distal ends of said beams.

5. An optical connector connecting apparatus comprising:
- a first optical connector fixedly supported on a body of said apparatus;
- a second optical connector movably supported on the apparatus body, said second optical connector being moved to be connected to said first optical connector;
- an elastic member for mediating between one of said optical connectors and the apparatus body; and
- a spring member producing a spring force in a direction of the axis of connection of said one optical connector is provided between said one optical connector and the apparatus body, wherein a connection loss, produced by a connection of said optical connectors is measured.

* * * * *